Figure 7:
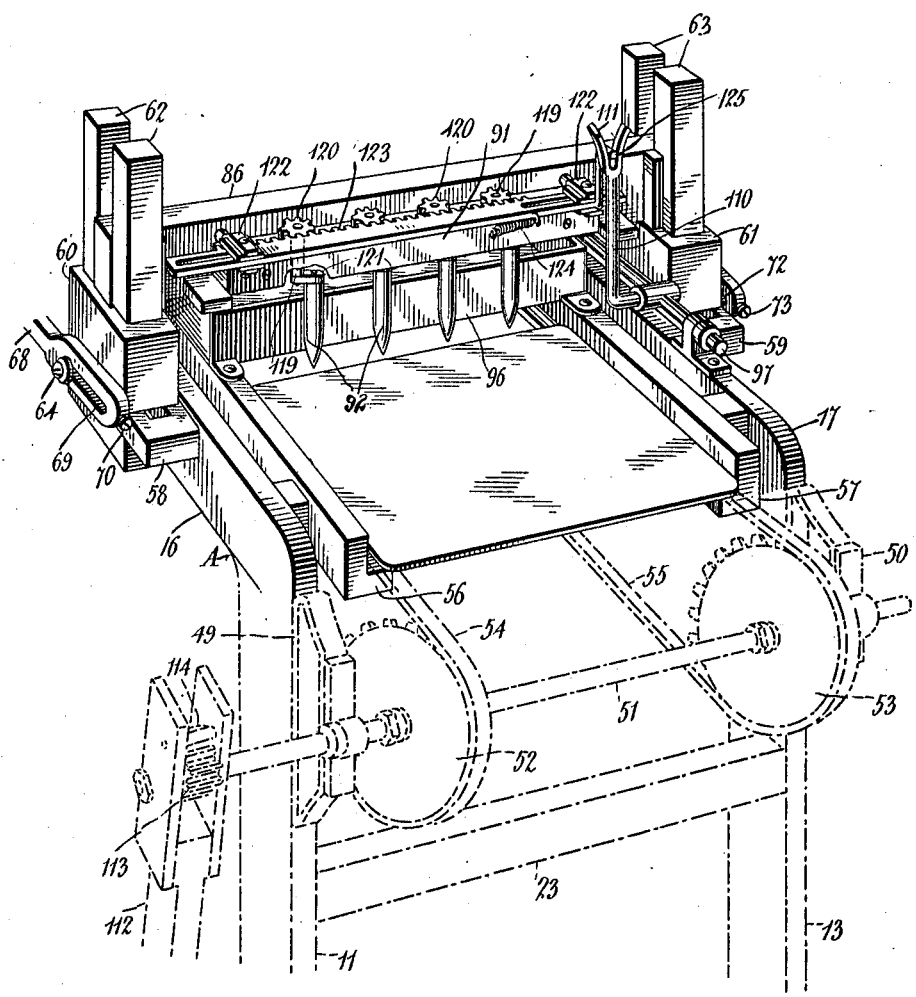

C. BERTOLOTTI & D. PICCARDO.
CONFECTION MARKING MACHINE.
APPLICATION FILED DEC. 15, 1910.
1,004,233.
Patented Sept. 26, 1911.
7 SHEETS—SHEET 1.
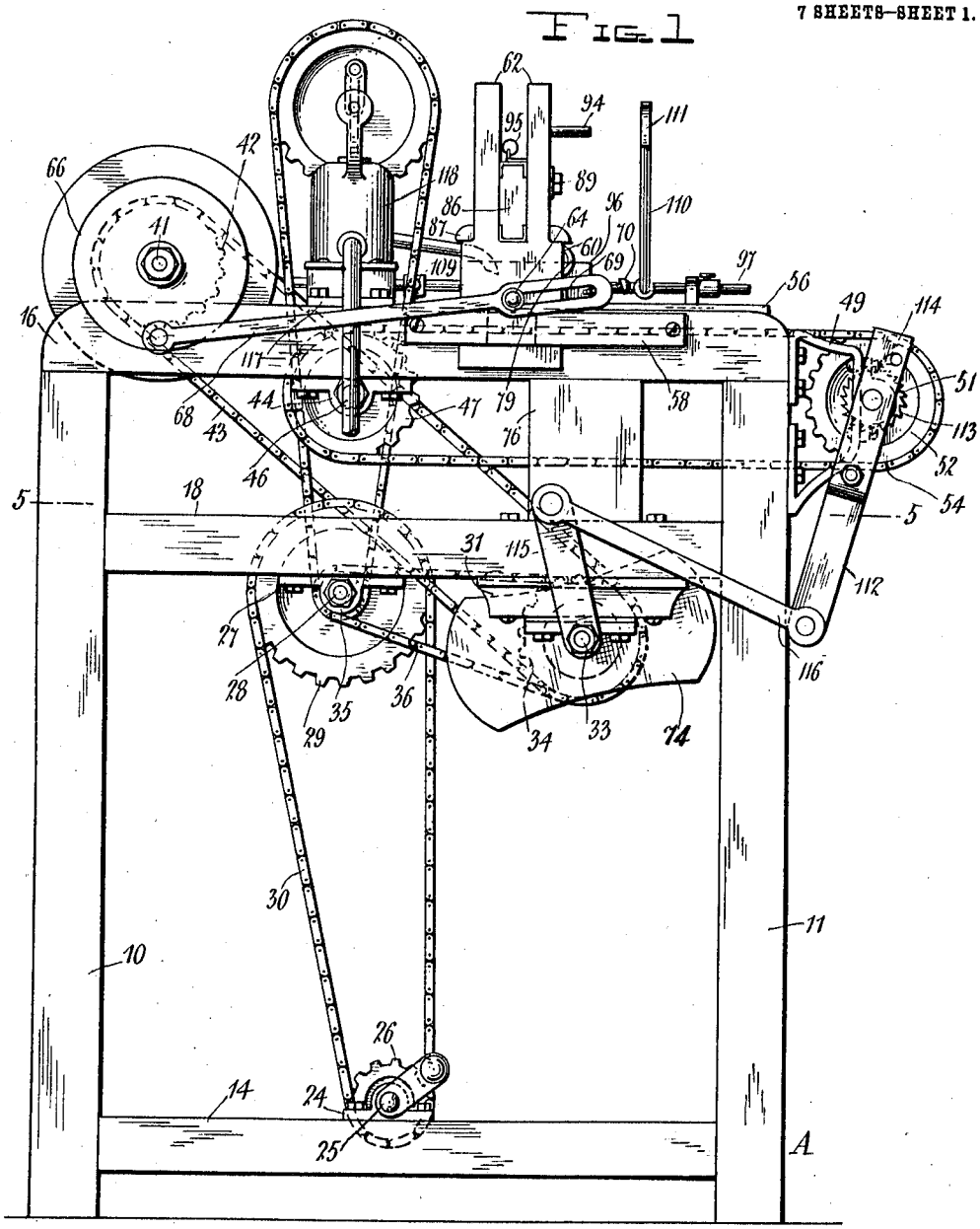
Witnesses
Inventors
Constantino Bertolotti and
Dionisio Piccardo,
By
Attorneys

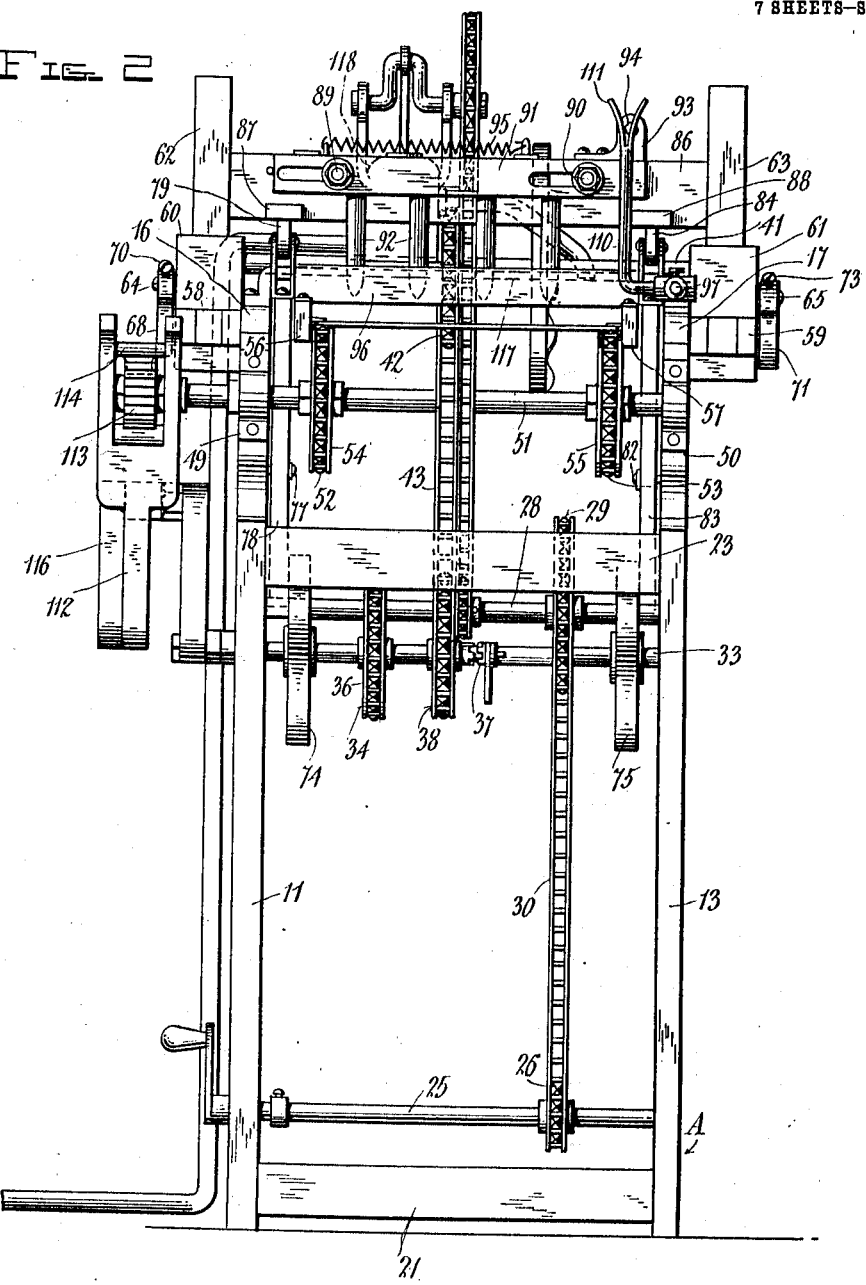

C. BERTOLOTTI & D. PICCARDO.
CONFECTION MARKING MACHINE.
APPLICATION FILED DEC. 15, 1910.
1,004,233.
Patented Sept. 26, 1911.
7 SHEETS—SHEET 3.
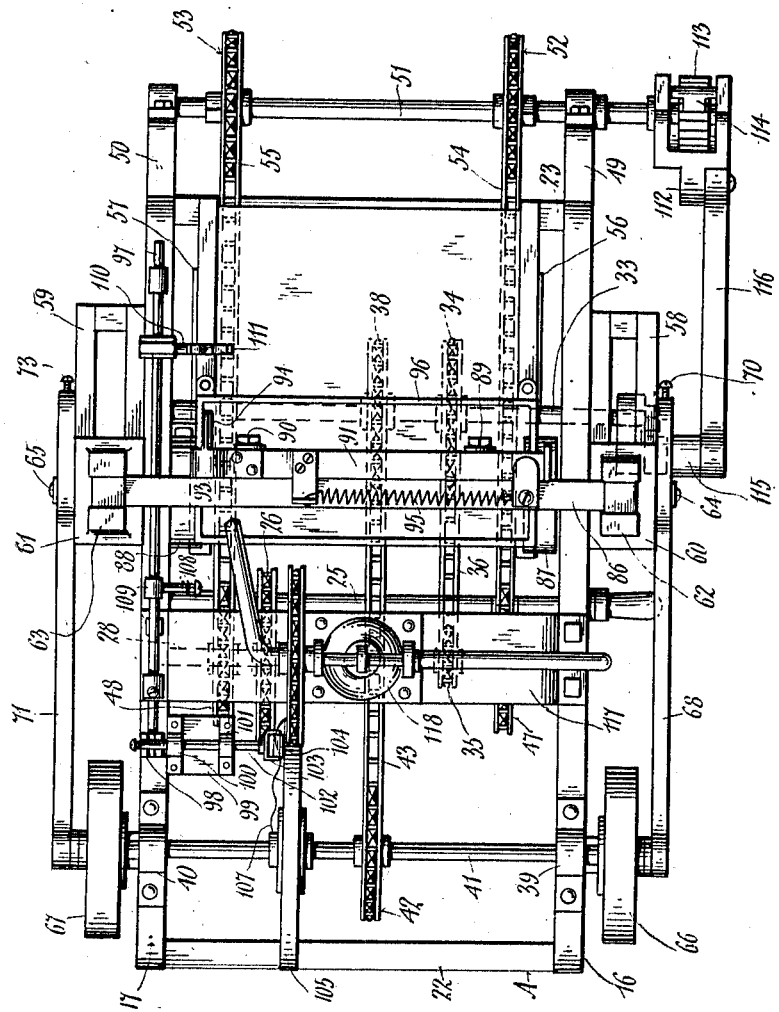
Inventors
Constantino Bertolotti and
Dionisio Piccardo
Witnesses
By
Attorneys

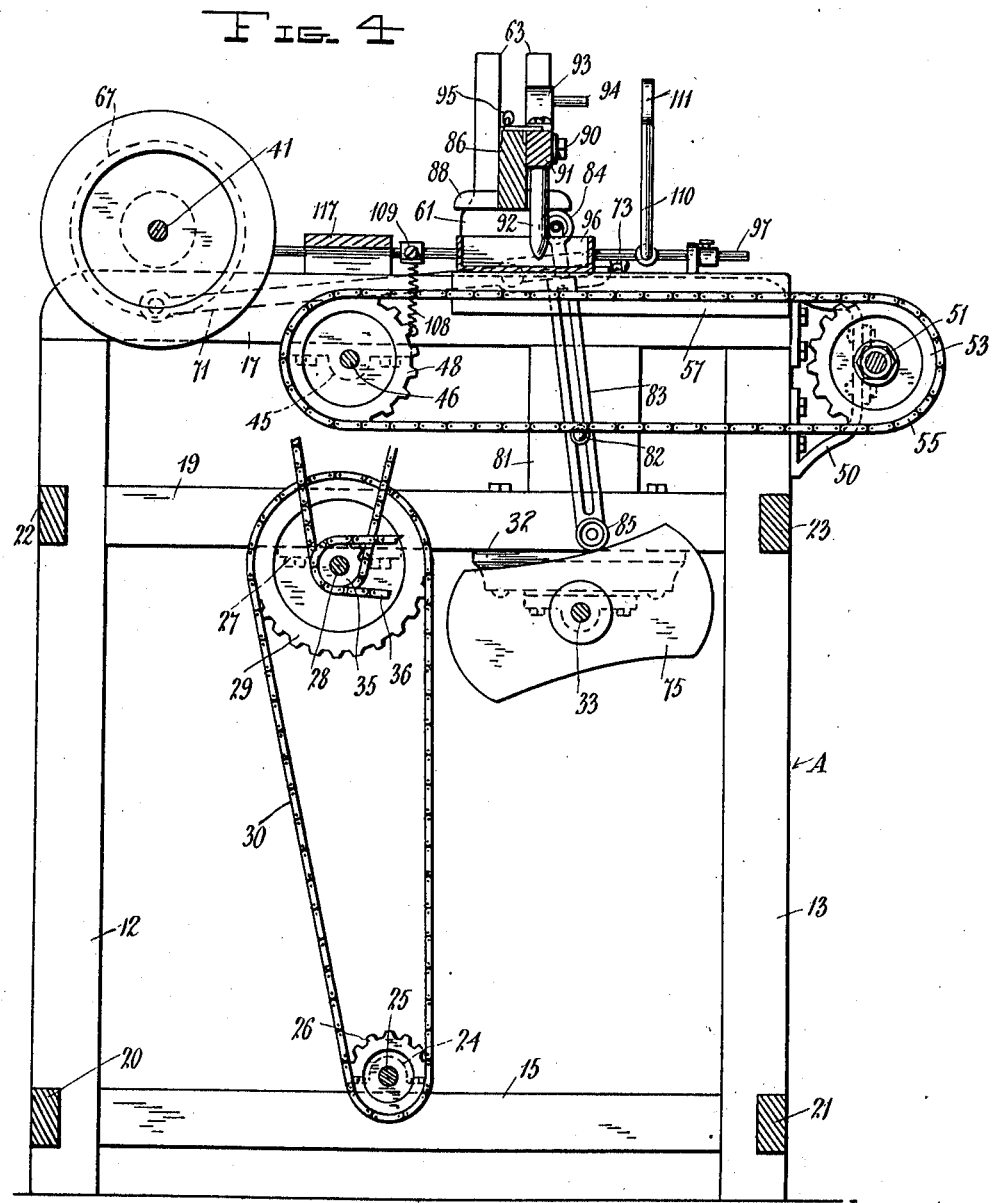

C. BERTOLOTTI & D. PICCARDO.
CONFECTION MARKING MACHINE.
APPLICATION FILED DEC. 15, 1910.
1,004,233.
Patented Sept. 26, 1911.
7 SHEETS—SHEET 5.
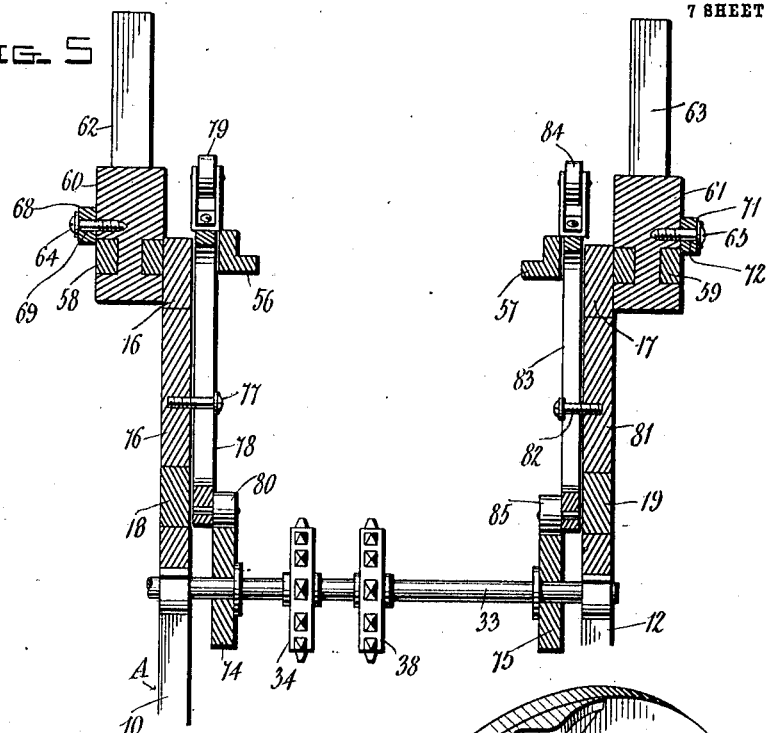
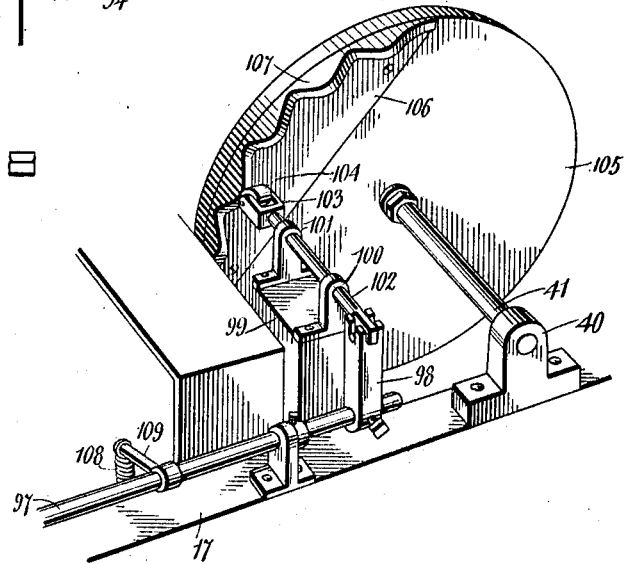
Witnesses
Inventors
Constantino Bertolotti and
Dionisio Piccardo
By 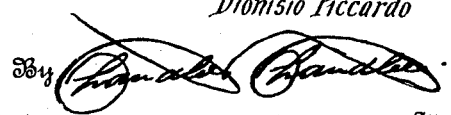
Attorneys

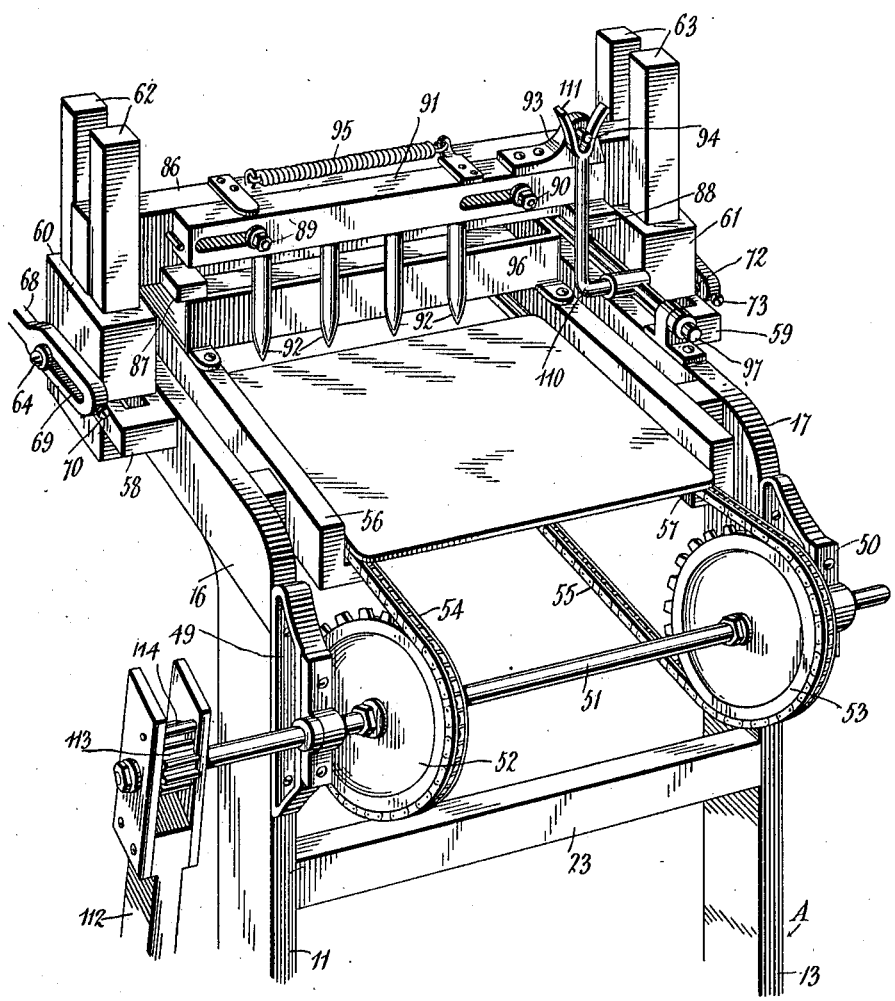

C. BERTOLOTTI & D. PICCARDO.
CONFECTION MARKING MACHINE.
APPLICATION FILED DEC. 15, 1910.

1,004,233.

Patented Sept. 26, 1911.

7 SHEETS—SHEET 7.

Witnesses
E. O. Crocker
Henry T. Bright

Inventors
Constantino Bertolotti and
Dionisio Piccardo

By Chandler & Chandler
Attorneys

UNITED STATES PATENT OFFICE.

CONSTANTINO BERTOLOTTI AND DIONISIO PICCARDO, OF NEW YORK, N. Y.

CONFECTION-MARKING MACHINE.

1,004,233.        Specification of Letters Patent.      Patented Sept. 26, 1911.

Application filed December 15, 1910. Serial No. 597,488.

*To all whom it may concern:*

Be it known that we, CONSTANTINO BERTOLOTTI and DIONISIO PICCARDO, the former a citizen of the United States and the latter a subject of the King of Italy, residing at New York, in the county of New York, State of New York, have invented certain new and useful Improvements in Confection-Marking Machines; and we do hereby declare the following to be a full, clear, and exact description of the invention, such as will enable others skilled in the art to which it appertains to make and use the same.

This invention relates to confection marking machines.

The object of the invention resides in the production of a machine of the character named, through the instrumentality of which confection cores which have been mechanically coated are supplied with an additional coating of a desired formation, whereby the confection so treated is made to resemble a hand-coated confection in every particular and the marketable value thereof materially increased.

A further object of the invention resides in the provision of a confection marking machine including an endless carrier upon which is adapted to be supported a tray for receiving cores previously coated and in providing means whereby the endless carrier and in turn the tray are moved during each operation of the marking element so as to cause the marking element to traverse the top of the cores; this movement of the tray being sufficient to position the unmarked cores so as to be treated by the marking element during its next operation.

A further object of the invention resides in the provision of a confection marking machine in which the marking element is automatically moved into the tank containing the marking material during each operation so as to receive a fresh supply of the latter.

A still further object of the invention resides in providing a machine of the character named with a new and improved form of marking element and a new and improved means for actuating said element.

With these and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1, is a side elevation of a confection marking machine constructed in accordance with the invention; Fig. 2, an end view of what is shown in Fig. 1, looking to the left; Fig. 3, a plan view of the machine; Fig. 4, a vertical longitudinal section through the machine; Fig. 5, a fragmental transverse section through the carrier of the marking element, the latter being removed from the carrier and certain parts of the machine disposed at the rear thereof omitted; Fig. 6, a detail perspective view of a fragment of the machine, showing the marking element in the position it would occupy just previous to its operation; Fig. 7, a view similar to Fig. 6, with a modified form of marking element employed; and, Fig. 8, a detail perspective view, showing the connection between the mechanism for operating the marking element and the driving mechanism of the machine.

Referring to the drawings, the machine is shown as comprising a frame A which is formed of the uprights 10, 11, 12 and 13, lower side bars 14 and 15, upper side bars 16 and 17, intermediate side bars 18 and 19, lower end bars 20 and 21, and upper end bars 22 and 23. Mounted upon the lower side bars 14 and 15 are bearings 24, in which is rotatably mounted a shaft 25 which constitutes the main drive shaft of the machine and may be operated either by hand or by connection with a suitable power source. Mounted upon the shaft 25 is a sprocket wheel 26 for a purpose that will presently appear. Secured to the lower side of the intermediate side members 18 and 19 are bearings 27, in which is rotatably mounted a shaft 28. Fixed upon this shaft 28 in the same vertical plane with the sprocket wheel 26 is another sprocket wheel 29, and upon these sprocket wheels 26 and 29 travels a sprocket chain 30. Also secured to the lower side of the intermediate side bars 18 and 19 are journal brackets 31 and 32, in which is rotatably mounted a shaft 33 which has fixed thereon a sprocket wheel 34. This sprocket wheel 34 is positioned in the same vertical plane with another sprocket wheel 35 fixed on the shaft 28 and a sprocket chain 36 travels on said sprocket wheels 34 and 35, whereby the rotation of the shaft 28 is transmitted to the shaft 33. Loosely mounted upon the shaft 33 and controlled by a clutch 37 is another sprocket wheel 38, the purpose of which will presently appear. Mounted upon the upper side of the top side bars 16 and 17 are journal bearings 39 and 40, in which is rotatably mounted a shaft 41, the terminals of said shaft being extended beyond the respective journal bearings. Fixed on the shaft 41 between the bearings 39 and 40 is a sprocket wheel 42, which is disposed in the same vertical plane with the sprocket wheel 38 mounted on the shaft 33, and a sprocket chain 43 travels on said sprocket wheels 38 and 42. By this construction, it will be apparent that the rotation of the shaft 33 will be transmitted to the shaft 41 when the clutch 37 is operated to engage the sprocket wheel 38.

Secured to the lower side of the upper side bars 16 and 17 respectively above the shaft 28 are journal bearings 44 and 45 respectively, in which is journaled a shaft 46. Fixed on this shaft 46 adjacent the upper side bars 16 and 17 respectively are sprocket wheels 47 and 48. Mounted upon one end of the upper side bars 16 and 17 and upon the outer face of the uprights 11 and 13 respectively are journal bearings 49 and 50, in which is rotatably mounted a shaft 51 disposed in the same horizontal plane with the shaft 46. Fixed upon this shaft 51 are sprocket wheels 52 and 53 which are disposed in alinement respectively with the sprocket wheels 47 and 48. Traveling on the sprocket wheels 47 and 52 is a sprocket chain 54, while another sprocket chain 55 travels on the sprocket wheels 48 and 53. These sprocket chains 54 and 55 are supported intermediately respectively upon rails 56 and 57 which are secured to the inner faces of the upper side bars 16 and 17, respectively. The chains 54 and 55 serve to support the core holding tray and are intermittently moved during the operation of the machine by a mechanism to be hereinafter more particularly referred to. Secured to and projecting outwardly from the outer face of the upper side bars 16 and 17 respectively are slotted members 58 and 59, and suitably mounted in the respective slots of these members are blocks 60 and 61. Projecting upwardly from the block 60 is a pair of parallel spaced arms 62, while corresponding arms 63 project upwardly from the block 61. The blocks 60 and 61 and their respective arms 62 and 63 constitute the carrier for the marking element and serve to constantly hold the same during its movement into and out of the tank containing the marking material, as will hereinafter more fully appear. Projecting outwardly from the block 60 is a stud 64, while a corresponding stud 65 projects outwardly from the block 61. Mounted upon one end of the shaft 41 exteriorly of the upper side bar 16 is a wheel 66, while a corresponding wheel 67 is mounted on the opposite end of said shaft 41 exteriorly of the upper side bar 17. A pitman 68 has one end eccentrically pivoted to the outer face of the wheel 66, while the other end of said pitman is slotted longitudinally, as at 69, and through this slot projects the stud 64 carried by the block 60. An adjusting screw 70 is mounted in the end of the pitman 68 adjacent the slot 69 and is arranged longitudinally of said pitman so that the inner end thereof is adapted to project into the slot 69 so as to limit the amount of relative movement between the pitman 68 and the stud 64 carried by the block 60. Another pitman 71 has one end eccentrically pivoted to the wheel 67, while its other end is slotted longitudinally, as at 72, and through this slot projects the stud 65 carried by the block 61. Mounted in the end of the pitman 71 adjacent the slot 72 is an adjusting screw 73 corresponding to the adjusting screw 70 and for the purpose of varying the amount of relative movement between the pitman 71 and the stud 65. From the construction so far described, it will be apparent that as the shaft 41 and the wheels 66 and 67 are rotated, a reciprocating movement will be imparted to the blocks 60 and 61. However, it will be equally apparent that as a result of the slots 69 and 72, the initial movement of the pitmen 68 and 71 in reverse directions will be without influence on the respective blocks 60 and 61.

Fixed on the shaft 33 inward of and adjacent the intermediate side bar 18 is a cam 74, while a similar cam 75 correspondingly disposed is fixed on said shaft 33 inward of and adjacent the intermediate side bar 19. Connecting the intermediate side bar 18 and the upper side bar 16 above the shaft 33 is a member 76, and projecting from the inner face of this member is a stud 77. Slidably mounted on this stud for a vertical movement is a slotted lifting bar 78, the upper end of which projects through the space between the side bar 16 and the rail 56 and carries a roller 79. Another roller 80 is mounted on the lower end of the bar 78 and is positioned for engagement by the cam 74 so that when said cam is rotated through the instrumentality of the shaft 33, the bar 78 will be elevated vertically. Connecting the intermediate side bar 19 and the upper side bar 17 is a member 81, which has projecting from its inner face a stud 82. Slidably mounted upon the stud 82 for vertical movement is another slotted lifting bar 83, the upper end of which projects through the space between the upper side bar 17 and the rail 57 and carries a roller 84. Another roller 85 is mounted on the lower end of the bar 83 and is positioned for engagement by the cam 75 during the rotation of the shaft 33, whereby said lifting bar may be elevated. By this construction, it will be apparent that as the shaft 33 is rotated, the cams 74 and 75 will coöperate with the lifting bars 78 and 80 so that the latter will be elevated and lowered in unison.

The marking element of the device is shown as comprising a body portion 86, the ends of which are slidably mounted between the arms 62 and 63 respectively. Secured to the lower side of said body portion 86 and disposed transversely thereof directly above the lifting bar 78 is a plate 87, the ends of which project beyond the side limits of the body portion 86. Another plate 88 is similarly secured to the body portion 86 at the opposite end so as to be disposed directly above the lifting bar 83. By this construction it will be apparent that when the lifting bars 78 and 83 are elevated in unison, they will respectively enter into a shifting engagement with the plates 87 and 88 and in turn raise the body portion 86 and that when said lifting bars move downward, the body portion 86 will also move downward under the influence of gravity. Projecting laterally from the body portion 86 in the direction of the shaft 51 are spaced studs 89 and 90 and slidingly mounted upon these studs for movement longitudinally of the body portion 86 is a finger bar 91 having secured thereto a plurality of depending fingers 92. Mounted upon the top of the finger bar 91 adjacent the arm 63 is a lug 93, which has projecting laterally therefrom in the direction of the shaft 51 a pin 94. The finger bar is normally held in the position shown in Fig. 2 by means of a spring 95, one end of which is secured to the body portion 86 and the other end to the finger bar. Supported upon the inner ends of the rails 56 and 57 is a tank 96 in which is adapted to be stored the material with which the confection cores are to be marked.

As has been previously stated, during the rotation of the shaft 41, the blocks 60 and 61 and the marking element carried thereby will be reciprocated so as to approach and recede from the tank 96. During this rotation of the shaft 41, the shaft 33 is also rotated through the connections heretofore described and this rotation of the shaft 33 will cause the cams 74 and 75 to elevate the lifting bars 78 and 83 during the reciprocation of the marking element. By reason of the engagement between the marking element and the lifting bars 78 and 83, it will be obvious that said element is successively raised and lowered during its reciprocation. The parts of the machine performing this function are arranged in such relation that the marking element is raised during its initial movement toward the tank 96 and lowered at the termination of such movement, while in its travel away from the tank 96, said marking element is likewise raised during its initial movement and lowered at the termination of its travel.

In order to impart a reciprocating movement to the finger bar 91 when the marking element has reached the limit of its travel away from the tank 96, the following structure is resorted to. Disposed longitudinally thereof and rotatably mounted upon the upper side bar 17 is a shaft 97, upon one end of which is fixed a laterally projecting arm 98. Secured to the inner face of the upper side bar 17 in line with the arm 98 is a block 99, upon which is mounted a pair of spaced ears 100 and 101. Slidably mounted in the ears 100 and 101 is a rod 102, one end of which is pivotally connected with the arm 98, while the other end is provided with a forked termination 103, between the arms of which is journaled a roller 104. Fixed upon the shaft 41 for engagement with the inner end of the rod 102 is a wheel 105 and mounted upon the side of this wheel is a segmental plate 106 provided with a cam face lateral extension 107 in line with the periphery of said wheel 105 and adapted to be engaged by the roller 104 as said wheel is rotated. The shaft 97 is normally held in position so as to maintain the roller 104 in engagement with the wheel 105 by means of a spring 108, one end of which is fixed to the arm 109 on said shaft and the other end secured to the upper side bar 17. Fixed on the shaft 97 at the opposite end from the arm 98 is another arm 110, the free end of which is bent upwardly and terminates in a forked portion 111. This arm 110 is positioned adjacent the outer face of the finger bar 91 and is so disposed that when the finger bar is lowered at the termination of its movement away from the tank 96, the pin 94 will enter the space between the arms of the forked termination 111. When disposed in this position the cammed lateral extension 107 enters into engagement with the roller 104, and as will be apparent, a rocking movement will be imparted to the shaft 97 which will in turn vibrate the arm 110 and reciprocate the finger bar 91. This reciprocation of the finger bars 91 will cause the fingers 92 to suitably mark the cores disposed therebeneath and carried by a tray supported upon the sprocket chains 54 and 55. When the cammed lateral extension 107 has moved out of engagement with the roller 104, the cams 74 and 75 shall have moved to a position so as to engage the rollers on the lower ends of the lifting bars 78 and 83. Further movement of said cams will then elevate the marking element to a position so as to clear the top of the tank 96 as the same is drawn in the direction of the tank under the influence of the movement of the pitmen 68 and 71.

During the reciprocation of the finger bar 91, the sprocket chains 54 and 55 and the core carrying tray supported by said chains are automatically moved so that the fingers 92 will traverse the tops of the cores during the reciprocation of said fingers. This automatic movement of the sprocket chains 54 and 55 is accomplished by the following structure. Rotatably mounted upon the shaft 51 exteriorly of the journal bearing 49 are the arms of a forked member 112, and fixed upon this shaft between the arms of said forked member is a ratchet wheel 113. The rotation of the forked member 112 in one direction is transmitted to the shaft 51 by means of a pawl 114 which is pivoted between the arms of the forked member and disposed in operative engagement with the ratchet wheel 113. Fixed upon the shaft 33 exteriorly of the journal bearing 31 is a crank arm 115, the free end of which is operatively connected to the free end of the forked member 112 by means of a link 116. During the rotation of the shaft 33, it will be apparent that the various connections just described will cause the forked member 112 to oscillate upon the shaft 51. During the oscillation of said forked member in one direction, however, the pawl 114 will engage the ratchet wheel 113 and effect a rotation of the shaft 33 so as to operate the sprocket chains 54 and 55. The crank arm 115, link 116, and forked member 112 are so arranged and positioned that the rotation of the shaft by their movement will be effected simultaneously with the reciprocation of the finger bar 91 and thus cause the fingers 92 to traverse substantially the entire top of a row of confection cores disposed upon a tray supported by the chains 54 and 55. It will be noted, however, that a movement of the chains 54 and 55 is continued slightly beyond the period of reciprocation of the finger bar 91 so as to bring the next row of cores carried by the tray into position to be treated upon the next reciprocation of the finger bar.

Spanning the upper side bars 16 and 17 between the shaft 41 and the tank 96 is a bridge 117, upon which is mounted a pump 118 which serves to draw the liquid chocolate from a suitable supply and deposit same in the tank 96. This pump is operated by a suitable connection with the shaft 28.

In the modified form of marking element shown in Fig. 8, the finger bar 91 is shown fixed to the body portion 86 and rotatably mounted in the finger bar 91 in parallel spaced relation to each other and transversely of said bar is a plurality of shafts 119, each of which have fixed on their upper end a pinion 120 and on their lower end a crank arm 121. Depending from each of the crank arms 121 eccentrically of the shaft 119 is a finger 92. Projecting laterally from the body portion 86 is a pair of spaced brackets 122 which slidably support a toothed rack 123 in operative engagement with the pinions 120 of the shafts 119 so that when said rack is reciprocated, the shafts 119 and the fingers 92 carried thereby will be rotated successively in the opposite direction. The rack is normally held in the position shown in Fig. 8 by means of a spring 124, one end of which is secured to said rack and the other end to the body portion 86. Reciprocation is imparted to the rack 123 by means of the forked arm 110; which receives in its free end just previous to the vibration of said arm a pin 125 projecting from the rack 123. In all other respects, the marking element illustrated in Fig. 8 operates in precisely the same manner as the marking element first described.

The operation of the machine as a whole is as follows:—Upon the rotation of the shaft 25 to the left in Figs. 1 and 4, the shaft 28 will be likewise rotated. By reason of the connections between the shaft 28 and the shaft 33, the rotation of the former will also be transmitted to the latter. Likewise the connections between the shaft 33 and the shaft 41 will cause the latter shaft to be simultaneously rotated with the shafts 33, 28 and 25, when the clutch 37 is moved to active position with respect to the sprocket wheel 38. During the rotation of the shaft 41, the pitmen 68 and 71 will slide the blocks 60 and 61 and the marking element carried thereby away from the shaft 41. During the initial movement of the blocks 60 and 61 away from the shaft 41, however, the cams 74 and 75 operate upon the lifting bars 78 and 83 respectively so as to elevate the marking element and permit the fingers thereof to clear the top of the tank 96. At the termination of the movement of the blocks 60 and 61 and the marking element away from the shaft 41 under the influence of the pitmen 68 and 71, the cams 74 and 75 permit the lifting bars 78 and 83 to descend, and likewise the marking element until the latter is correctly positioned to operate upon the cores contained on a tray supported by the sprocket chains 54 and 55. During this last named descent of the marking element, the pin 94 passes into the forked end 111 of the arm 110. Immediately upon the entrance of the pin 94 into the forked end 111, the cam extension 107 of the plate 106 enters into engagement with the roller 104 so that a continued rotation of the wheel 105 will rock the shaft 97 and in turn vibrate the arm 110. This vibration of the arm 110 will cause the finger bar 91 to be reciprocated. During this reciprocation of the finger bar, the forked member 112 is being moved in a direction to cause the pawl 114 to operatively engage the ratchet wheel 113 and rotate the shaft 51, causing the chains 54 and 55 to move in unison beneath the finger bar.

During this movement of the chains, the core supporting tray carried thereby will be shifted so that the fingers 92 would traverse the tops of confection cores seated upon the tray. Upon the rearward movement of the blocks 60 and 61 under the influence of the pitmen 68 and 71, the lifting bars 78 and 83 are again operated by the cams 74 and 78 respectively so as to elevate the marking element and permit the teeth 92 to clear the top of the tank 96 in the movement of the marking element toward the shaft 41. At the termination of this last named movement of the marking element, the cams 74 and 75 again permit the lifting bars 78 and 83 to descend so that the teeth 92 will be immersed in the marking material contained in said tank and thus rendered ready for the next operation.

What is claimed is:—

1. In a machine of the class described, the combination with a movable carrier for the confection cores, of a marking material supply, a marker constructed and arranged for both movement to and from the marking material supply and superficially of the carrier, means for actuating the marker to and from the marking material supply, and means for moving said marker superficially of the carrier at the termination of its movement from the marking material supply.

2. In a machine of the class described, the combination with a movable carrier for the confection cores, of a marking material supply, a marker constructed and arranged for vertical movement and for movement to and from the marking material supply, means for moving said marker to and from the marking material supply, and means for elevating and lowering said marker at the beginning and termination respectively of its movement to and from the marking element supply.

3. In a machine of the class described, the combination of a frame, a movable carrier for the confection cores mounted in said frame, a marking material supply, a marker constructed and arranged for vertical movement and for movement to and from the marking material supply, a plurality of vertically movable lifting members mounted in the frame and engaging said marker to elevate and lower same, and means for elevating and lowering said lifting members at the beginning and termination respectively of the movement of the marker to and from the marking material supply.

4. In a machine of the class described, the combination with a movable carrier for the confection cores, of a marking material supply, a marker constructed and arranged for movement to and from the marking material supply, means for moving said marker to and from the marking material supply, a plurality of fingers carried by said marking element, a slidable member carried by the marking element and operatively connected to said fingers, whereby the sliding of said element will move the fingers superficially of the carrier, an oscillating shaft, an arm on said shaft, means for detachably connecting said arm with the sliding member of the marking element when said element is disposed at the limit of its movement away from the marking material supply, and means for rocking said shaft when the arm and sliding member are detachably connected.

In testimony whereof we affix our signatures in presence of two witnesses.

CONSTANTINO BERTOLOTTI.
DIONISIO PICCARDO.

Witnesses:
Louis Roffo,
Anthony Steffo.

Copies of this patent may be obtained for five cents each, by addressing the "Commissioner of Patents, Washington, D. C."